CATHODE RAY BEAM CONTROL APPARATUS

Filed Aug. 21, 1956

INVENTOR.
Merlyn M. Armstrong
BY Richard G. O'fallon
Mueller & Aichele
Attys.

United States Patent Office 2,880,366
Patented Mar. 31, 1959

2,880,366

CATHODE RAY BEAM CONTROL APPARATUS

Merlyn M. Armstrong, Oak Park, and Richard G. O'Fallon, Westchester, Ill., assignors to Motorola, Inc., Chicago, Ill., a corporation of Illinois Application August 21, 1956, Serial No. 605,302
8 Claims. (Cl. 315—27)

The present invention relates to color television receivers and more particularly to a system for controlling the raster size produced by one beam of a tri-beam cathode ray tube as used in such receivers.

In the usual tri-beam cathode ray tube the beam sources are equally spaced about the axis of the neck of the tube, and the three beams are deflected simultaneously by a common line and field deflection system in order that they scan the screen. In such a tube it is necessary that the three beams be converged at each aperture of a shadow mask disposed between the beam sources and screen so that they pass through the apertures to impinge upon their associated phosphor dots of the screen and that such beam convergence be maintained throughout the entire scanning cycle of the beams. However, since the electron beams are scanned through a rather wide angle and across a mask all parts of which are not equidistant from the sources of the beams, the amount of convergence applied to the beams must be varied during the scanning operation, and a dynamic convergence control must be used. This control is synchronized with the line and field sweep of the beams so that they remain converged throughout the entire scanning operation.

Usually the tube is oriented so that the beam gun associated with the blue phosphor dots in each dot triad is on the vertical axis of the tube, with the red and green beam guns respectively spaced 120° around the tube neck on each side of the blue beam gun. Then a field producing device for dynamically converging each beam is mounted adjacent the path of each of the beams. These field producing devices also commonly have provision for convergence of the beams when undeflected, i.e. in static condition. However, the fields for both dynamic and static convergence provide beam control along radial lines spaced at 120° intervals around the tube neck. Thus it may be visualized that two of the beams, in practice the red and green beams, may be statically converged at the screen center by adjustment of the associated field producing devices, but that such adjustment may not necessarily converge the remaining beam, the blue one, at the same point. This situation is remedied in the present state of the art by utilizing a blue beam lateral corrector magnet to provide lateral or tangential shift of this beam at right angles to the effect of the convergence control thereof. Of course, once static convergence is obtained, the dynamic convergence signals may be applied to effect alignment of the beams in all scanned positions to provide three different rasters which appear superimposed.

The above described convergence control is commonly applied to the beams before they are deflected but it may be appreciated that deflection is applied to the beams when they are equilaterally spaced from one another about the tube axis. Therefore, if the deflection field is not uniform in its effect on all of the beams, there can be a noticeable impairment of the composite raster due to the difference in deflection of one beam with respect to another. The practical construction of cathode ray tubes and deflection yokes presents some difficulties in this regard due to the problem of maintaining design tolerances. Additionally, there can be various inter-actions among the components of a television receiver which also tend to adversely effect the desired registry of the rasters. As a still further problem in receiver construction, it has been found that an optimum deflection field for the red and green beams to minimize what is known in the art as keystoning, or the effect of the red raster being larger than the green raster on one side of the screen and the reverse situation on the other side of the screen, often tends to impair the blue raster. This is because some tube and deflection yoke combinations produce minimum keystone effect when the horizontal deflection field is somewhat stronger on either side of the exact center of the tube neck. As previously pointed out, the blue beam travels a path intermediate that of the red and green beams as far as the horizontal deflection field is concerned so that an optimum deflection field for the red and green beams may not be optimum for the blue beam. In most cases, the blue beam, in experiencing a weaker deflection field, tends to produce a smaller raster than both the red and green beams. However, in some receivers of practical construction it has been found that optimum adjustment of the red and green rasters is obtained when the blue raster is somewhat larger than the other two.

Accordingly, it is an object of this invention to provide easily adjustable apparatus for a color television receiver for controlling the size of the blue raster with respect to the red and green rasters.

Another object is to provide apparatus which is adjustable to compensate dynamically for different tri-beam cathode ray tube and deflection yoke combinations, as well as to compensate for the effects of certain types of corrections applied to one or more of the beams in the cathode ray tube.

Still another object of the invention is to provide a simple, inexpensive system for improving the color rendition in a color television receiver.

A feature of the invention is the provision of a dynamically controlled field producing device disposed adjacent the path of one beam in a tri-beam cathode ray tube and oriented to produce a field for controlling the beam in the direction of the line sweep thereof to obtain dynamic variation of the raster size produced by the beam.

Another feature of the invention is the provision of a blue beam lateral corrector in a tri-beam cathode ray tube including an adjustable permanent magnet and an adjustable inductor associated therewith. The inductor is energized by a sawtooth signal obtained from the line sweep system in order to effect selected dynamic variation of the scansion or lateral deflection of the beam.

Further objects, features and the attending advantages of the invention will be apparent upon consideration of the following description when taken in conjunction with the accompanying drawing in which.

Figures 1, 2, 3, 4:
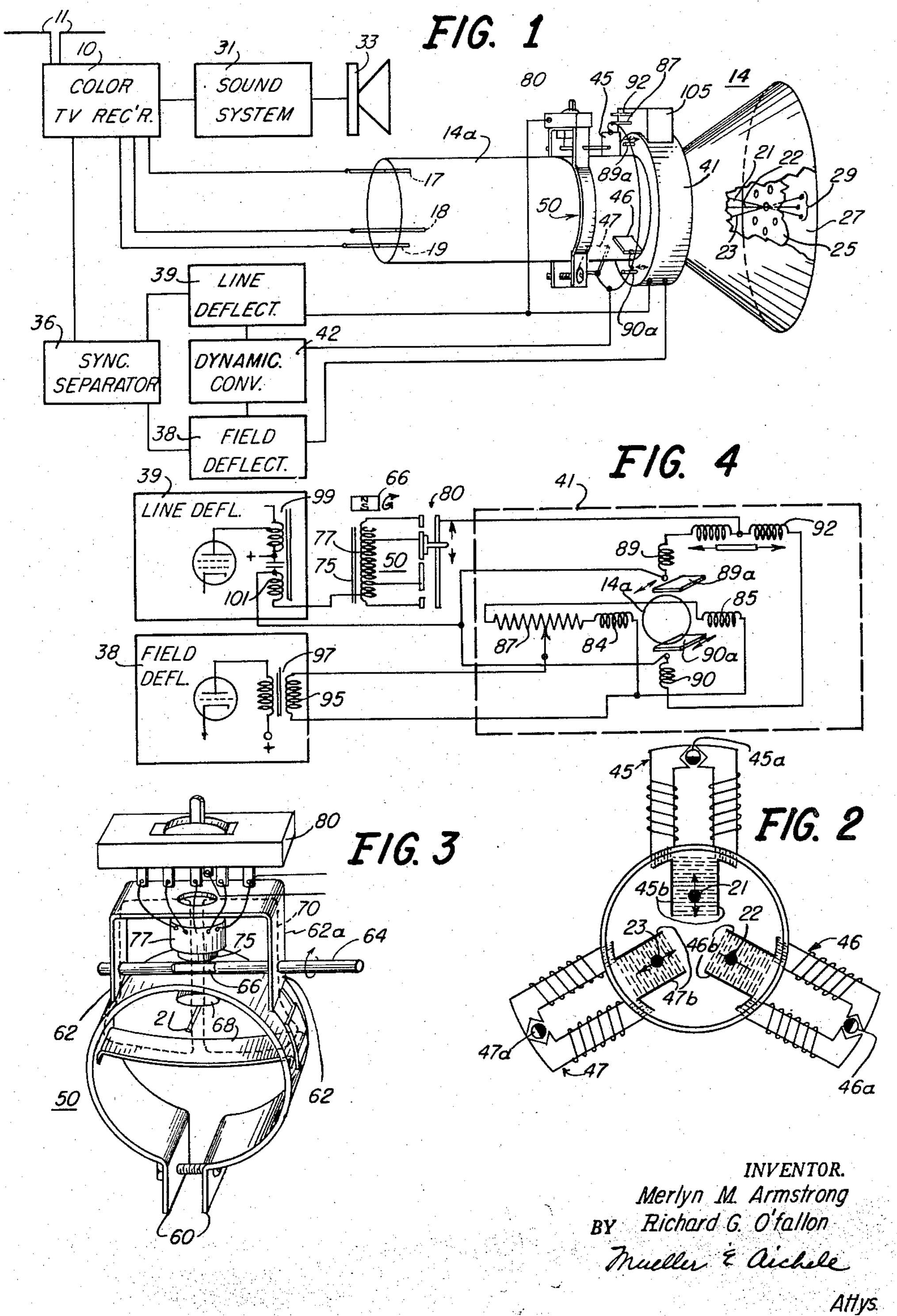
Fig. 1 is a block diagram of a color television receiver incorporating the invention.
Fig. 2 is a sectional view of the neck of a tri-beam cathode ray tube.
Fig. 3 is a perspective view of a portion of the beam controlling apparatus of the invention.
Fig. 4 is a schematic diagram of a portion of the circuit of Fig. 1.

In the preferred form of the invention there is provided a blue beam lateral corrector for a tri-beam cathode ray tube. The usual orientation of a tri-beam cathode ray tube establishes the blue beam gun along a vertical axis of the tube which positions this gun approximately centrally of the horizontal dimension of the tube screen. An adjustable permanent magnet is supported adjacent the preconvergence path of this beam to furnish lateral shift thereof for static convergence purposes. Also included with the permanent magnet is a tapped inductance coil with its field selectively additive or subtractive to that of the permanent magnet field. A switch associated with this coil provides adjustment of the field produced thereby and this entire device is series coupled with the line sweep system and its associated deflection yoke of the television receiver. Accordingly, a sawtooth current wave form is applied to the inductance coil and this effects a dynamic change in the blue beam raster size to assist in the optimum reproduction of color images by the tube.

Referring now to the drawing, Fig. 1 shows a color television receiver 10 coupled to an antenna 11. Receiver 10 provides signals derived from a received television wave for the cathode ray image reproducing device 14 and these signals are applied to the equally spaced electron beam sources 17, 18 and 19. These beam sources are associated with the blue, red and green primary colors and produce electron beams 21, 22 and 23, respectively. An apertured shadow mask 25 is disposed near the screen 27 and beams 21, 22 and 23 are converged in the individual apertures of this mask during the scanning operation so that each beam impinges upon its associated phosphor dots in each triad, such as triad 29. The different dots of each triad produce the colors red, blue and green when impinged by the beams. The triads then each become a colored element of a complete image. It may be appreciated that the apparatus is shown greatly out of proportion to facilitate explanation.

A sound system 31 is also coupled to the receiver 10 and this system applies the derived audio to loudspeaker 33. The receiving system further includes a synchronizing signal separator circuit 36 which, together with the vertical or field deflection circuit 38 and the horizontal or line deflection circuit 39, comprises the sweep system of the receiver. Circuits 38 and 39 are coupled to the deflection yoke 41 which is disposed on the neck of the cathode ray tube 14 so that signals applied to the yoke produce suitable line and field scanning of the beams simultaneously across screen 27.

It should be apparent that as the electron beams are scanned across the screen they will not always converge in an aperture of mask 25 since the mask and screen do not have sufficient curvature to coincide with the arc of the convergence point as the beams are scanned. The beam sources 17, 18 and 19 may be tilted somewhat so that the beams will be converged at the center of screen 27, at least to the extent possible within manufacturing tolerances, but since convergence would not prevail at other than the center of the screen, the beams would ordinarily not impinge their intended phosphor dots in all the triads. Accordingly, the point of convergence is continually varied during each line and field scanning cycle by means of a dynamic convergence system 42. System 42 is connected to line and field deflection circuits 39, 38 and is controlled by signals from these circuits. The output of the convergence system is applied to the dynamic convergence coils 45, 46 and 47. These coils are mounted in proximity to the paths of the beams from sources 17, 18 and 19, respectively so as to develop fields for causing proper convergence of the beams. The line deflection circuit 39 is also coupled to the blue beam control apparatus 50, the exact functioning of which will be explained in greater detail.

Fig. 2 is a sectional representation of the neck **14*a* of the cathode ray tube 14. It may be noted that convergence coil 45 is disposed along the vertical axis of the neck and that coils 46 and 47 are positioned on opposite sides of electrode 45 and at 120° therefrom. Each of these coils is coupled to the dynamic convergence system 42 to be energized thereby. The coils further include separate pole pieces between which are disposed respective permanent magnets 45*a*, 46*a* and 47*a*. These magnets are magnetized across their diameters so that rotation thereof will vary a field set up in the pole pieces of the coils. The pole pieces are further magnetically coupled to internal pole pieces of the cathode ray tube between which the electron beams travel. The internal pole pieces are designated 45*b*, 46*b* and 47*b*. The electron beams 21—23 are moved along respective radial lines which are spaced 120° apart by means of the magnetic fields established between the internal pole pieces by coils 45—47**.

For static convergence of the beams, generally effected at the center of the screen, the permanent magnets **45*a*, 46*a* and 47*a* are adjusted. However, due to manufacturing tolerances or variations in a particular receiver circuit, the crossing point or convergence point of the beams 22, 23 may not lie on the vertical line along which the beam 21 may be made to travel by adjustment of magnet 45*a*. Accordingly, in color television systems of this type, it has been common to provide a further permanent magnet for lateral correction of beam 21** that is tangential movement thereof with respect to a circle through the normally equilaterally spaced beam paths. This correction would, of course, be applied to move the beam horizontally or in the direction of the line sweep of the beams as scanned across the screen.

The blue beam correction apparatus 50 to accomplish this lateral shift of the blue beam is shown in Fig. 3. This apparatus includes a non-magnetic clamping strap 60 which is fastened to an external magnetic pole piece 62 forming a frame structure which may be securely locked on the neck **14*a* of the cathode ray tube. This pole piece also includes an integrally formed bridge 62*a* which extends outwardly from the tube neck and forms a support for the shaft 64. Shaft 64 is rotatably mounted in bridge 62*a* and carries a permanent magnet 66 which is magnetized across a diameter of shaft 64. The correction apparatus 50 is mounted on the tube neck with the permanent magnet 66 near the path of the blue beam 21 as shown in Figs. 1 and 3. The usual tri-beam cathode ray tube includes internal blue lateral pole pieces 68 which provides a magnetic flux path through the tube neck. This flux path is illustrated by the dotted lines 70 in Fig. 3 and is in part essentially perpendicular to the beam 21. It should be apparent that by rotation of shaft 64 either the north or south poles of magnet 66 may be brought into proximity with the beam 21 and that by such adjustment, lateral shift of this beam may be effected. Such lateral adjustment of the blue beam together with adjustment permanent magnets 45*a*, 46*a* and 47*a* can provide complete static convergence of the electron beams. It is preferable to space the ends of bridge 62*a* considerably greater than the length of magnet 66** to reduce the tendency for flux shunting by the bridge and to increase the sensitivity of the dynamic control.

As previously mentioned, it has been found that due to differences in various tube and deflection yoke combinations and some types of corrections applied to the red and green beams, as well as other random interactions among the components of the television receiver, the horizontal deflection of the blue beam may not be the same amount as the deflection of the red and green beams. This results in a variation of the blue raster size as compared with the sizes of the red and green rasters. In order to correct this difficulty and to permit an adjustment which compensates for its occurrence, the blue beam lateral correction apparatus also includes a provision for dynamically changing the size of the blue raster. This consists of a magnetic core 75 supported by and extending downwardly from the center of bridge **62*a*, and therefore disposed along the vertical axis of the tube neck, and an inductance coil 77 wound upon this core. The apparatus 50 preferably further includes a switch 80 mounted therewith which is connected to various taps of coil 77 to permit variation in the amount of the magnetic field produced by the unit. It is contemplated that coil 77 be energized by a sawtooth current wave form at the line deflection frequency, which can be derived from circuit 39**, in order to provide a variation of the scanning of the blue beam according to the deflected position of all of the beams to compensate for the above described deficiencies.

The circuit shown in Fig. 4 illustrates a manner of connecting the inductance coil 77 so as to provide the proper energization thereof. It may be seen that deflection yoke 41 consists of a pair of field deflection coils 84, 85 disposed on opposite sides of the tube neck **14*a* and series connected through the fixed portion of potentiometer 87. Similarly line deflection coils 89, 90 are supported along opposite sides of the tube neck and are series connected through a variable inductor 92. Deflection signals at the field frequency, ordinarily signals of sawtooth current wave form a 60 cycles per second, are applied to a movable arm of potentiometer 87 and the common interconnection of field deflection coils 84, 85 by means of an output winding 95 of vertical output transformer 97. Transformer 97 is included in the field deflection circuit 38 and may be energized by means of circuits which are known in the art. Similarly, a horizontal output transformer 99 is included in the line deflection circuit 39 and may be energized by means of known circuits. An output winding 101 of transformer 99 has one side coupled to the common interconnection of line deflection coils 89 and 90 and a further terminal coupled through the blue beam correction apparatus 50 to a center tap point of variable inductor 92. Accordingly, current signals of sawtooth wave form, generally at 15.75 kc., are applied to the line deflection coils so as to scan the electron beams in a horizontal direction. Adjustment of potentiometer 87 and variable inductor 92 permits variation in the signal currents in the different yoke coils and may be termed balancing elements of the deflection system. Adjustment of inductor 92 provides a variation in the fields produced by coils 89 and 90 to correct for red, green horizontal line "skewness," or divergence of the horizontal traces produced by these beams. The balancing potentiometer 87 similarly allows regulation of the field produced by coils 84 and 85 to correct for differences in the red, green vertical raster size, that is, the parallel but spaced traces developed by the red and green beams along the top or bottom sides of screen 27. Potentiometer 87 and variable inductor 92 may be conveniently mounted in a supporting device 105 (Fig. 1) which forms a part of the yoke structure 41**. This balancing system is described more fully and claimed in copending application of Richard G. O'Fallon, bearing Serial No. 505,619, filed May 3, 1955, now U.S. Patent No. 2,825,846.

It has also been found preferable to include in a television receiver of this type a provision for the correction of "keystoning" of the red and green rasters. This effect may be observed as an increase of the red raster size on one side of the screen and a decrease in the size thereof on the other side of the screen. At the same time the green raster size is decreased on the first side of the screen but increased on the opposite side thereof. Such a keystone effect is the result of variation in the yoke field distribution from the design center and is, of course, due to the fact that the beam sources are spaced from one another and that as a practical matter the deflection yokes and cathode ray tubes of producion quality do not provide an optimum match for one another so as to produce equal effects on these spaced beams. A method of correcting this keystone effect is to utilize small pieces of low loss magnetic material which may be introduced at various positions of the yoke deflection field to vary slightly the field as produced by one coil with respect to that of the other and thereby change the distribution of the field produced by the yoke to correct for the unbalance. Accordingly, an adjustable slug **89*a* is shown disposed along the upper part of the tube neck and a similar adjustable slug 90*a* is shown disposed along the lower part of all within the yoke field. It is preferable to construct slugs 89*a* and 90*a*** of low loss magnetic material and to have them adjustable with respect to the yoke field as shown in Figs. 1 and 4. These correctors are described and claimed in copending application of Gerald Caprio, Serial No. 607,498 filed August 31, 1956.

With a given tube and deflection yoke combination, it may be found that optimum keystone correction requires unequal or unbalanced adjustments of the slugs **89*a* and 90*a* in each coil window thus producing a red, green horizontal line skewness condition. As previously pointed out, this may be corrected by adjustment of variable inductor 92. However, in making these beam corrections there may very well be a change in the distribution of the yoke field so as to alter the size of the raster produced by the blue beam. For example, the above described corrections may produce a deflection yoke field which is stronger on opposite sides of the vertical axis through the tube neck than it is exactly on this axis. Accordingly, the red and green beams would be deflected by a stronger line scanning field than would the blue beam, which is disposed on the vertical axis of the tube neck. It is also possible that the opposite condition could exist wherein optimum control of the red and green beam is produced by a yoke field which is stronger in the center than either side thereof. The blue beam lateral correction apparatus 50** provides a dynamic correction of the blue beam raster size to account for this type of variation in the yoke field distribution.

As may be seen in Fig. 4 the line deflection signals of sawtooth current wave form are applied to the deflection yoke 41 through the inductance coil 77. The magnetic core 75 of this coil is, as previously described, supported adjacent the permanent magnet 66 so that the field produced by this coil is in additive or in subtractive relation with the field of the permanent magnet.

Various tap points of coil 77 are connected to the switch 80, which is of the shorting type so that its adjustment will not interrupt the line scanning signal. It is preferable to couple one terminal of output winding 101 of transformer 99 to a portion of coil 77 which is intermediate the end terminals thereof so that by connecting contacts of switch 80 to various points on coil 77, the influence on the blue beam may be such as to increase or decrease the raster size produced thereby.

The functioning of the switch may be understood by considering that a sawtooth signal applied to coil 77 will be zero and that it will increase as the beam is scanned to either side of the center of the screen so that the raster size produced by this beam is larger or smaller than that produced by the other beams, depending on the setting of switch 80. Thus by adjustment of this switch a sawtooth signal at the line deflection frequency may add to or subtract from the effect of the line deflection of the blue beam with respect to the deflection of all of the beams produced simultaneously by yoke 41.

The invention provides therefore, simple apparatus for a color television receiver to control the image produced thereby. The apparatus is of comparatively inexpensive construction and permits an adjustment which is highly desirable to correct for variations in tube and yoke combination as well as to compensate for other types of corrections which may be applied to the beams of a tri-beam cathode ray tube all for the purpose of producing optimum registration of the rasters produced by each of the beams.

We claim:

1. In a color television receiver including a tri-beam cathode ray tube having a neck section through which the beams pass along paths substantially equally spaced about an axis thereof and line and field sweep systems which develop respective sawtooth signals for deflecting the beams to form rasters associated with each beam, apparatus for controlling the raster size produced by one beam with respect to the raster sizes produced by the other beams, including in combination, field producing means disposed in proximity to a predeflection path of said one beam, said field producing means being oriented to provide a field producing tangential displacement of said one beam with respect to a circle passed through said beam paths in said tube neck, and circuit means for coupling the line sweep system to said field producing, said circuit means supplying signals of substantially sawtooth form for energizing said field producing means thereby and dynamically controlling said raster size produced by said one beam in accordance with line deflection signals.

2. In a color television receiver including a tri-beam cathode ray tube, line and field sweep systems for deflecting the beams to produce respective rasters associated therewith, and a convergence control system for dynamically controlling the beams according to the deflected positions thereof, apparatus for dynamically controlling the raster size produced by one beam with respect to the raster sizes produced by the other beams, including in combination, an adjustable permanent magnet disposed adjacent a preconvergence path of said one beam and oriented to produce a field substantially perpendicular to the direction of line deflection, a tapped inductance coil supported adjacent said permanent magnet and oriented to produce a field additive and subtractive with the field therefrom, a switch for selecting a tap on said inductance coil, and means for coupling said switch and said inductance coil to the line sweep system for energizing said inductance coil and controlling the size of the raster associated with said one beam in accordance with line deflection signals.

3. In a color television receiver including a tri-beam cathode ray tube, line and field sweep systems for applying sawtooth signals to a deflection yoke for simultaneously deflecting the beams to produce respective rasters associated therewith, and a convergence control system for dynamically controlling the beams according to the deflected positions thereof and wherein the line deflection of one beam, adapted to travel a path intermediate the paths of the other beams with respect to the line sweep direction, may be different from the line deflection of such other beams, apparatus for dynamically controlling the amount of deflection of said one beam with respect to the amounts of deflection of said other beams, including in combination, an adjustable permanent magnet disposed near a preconvergence path of said one beam and oriented to produce a relatively fixed field which field shifts said one beam in the direction of line deflection, a tapped inductance coil supported with said permanent magnet and oriented to produce a field to combine with said fixed field therefrom, a switch for selecting a tap on said inductance coil, circuit means adapted to be coupled to the line sweep system and to said switch and said inductance coil to provide saw tooth signals at the line deflection frequency for energizing said inductance coil and controlling the amount of deflection of said one beam in accordance with line deflection thereof.

4. In a color television receiver including a tri-beam cathode ray tube adapted to produce three electron beams which travel through a neck of the tube and including a line and field deflecting system for developing sawtooth signals and a deflection yoke energized thereby to simultaneously scan the beams so that they produce red, blue and green rasters and wherein the one beam associated with the blue raster travels a path intermediate the paths of the other beams with respect to the direction of line deflection of the beams, apparatus for dynamically controlling the size of the blue raster including in combination, a frame adapted to be supported on the neck of the cathode ray tube, inductor means supported by said frame adjacent a predeflection path of said one beam and oriented so that a field produced thereby provides shift of said one beam in the direction of line deflection, and means adapted to be coupled to the line deflection system and connecting said inductor means and a portion of the deflection yoke in series for applying sawtooth signals of line deflection frequency to said inductor means for controlling said one beam in accordance with the deflected position thereof.

5. In a color television receiver including a tri-beam cathode ray tube adapted to produce electron beams which travel through a neck of the tube and including line and field deflecting systems coupled to a deflection yoke for applying sawtooth signals to said yoke for simultaneously scanning the beams so that they produce red, blue and green rasters and wherein the one beam associated with the blue raster travels a given path intermediate the paths of the other beams with respect to the direction of line deflection of the beams, apparatus for dynamically controlling the size of the blue raster with respect to the sizes of the other rasters including in combination, a frame adapted to be supported around the neck of the cathode ray tube, inductor means supported by said frame adjacent a predeflection path of said one beam and oriented so that a field produced thereby provides shift of said one beam in the direction of line deflection, variable means for adjusting the strength and sense of the field produced by said inductor means, and means for coupling the line deflection system to said inductor means for applying sawtooth signals of line deflection frequency to said inductor means for controlling said one beam in accordance with the deflected position thereof.

6. In a color television receiver, a tri-beam cathode ray tube, first circuit means providing vertical deflection signals for scanning the beams in said cathode ray tube, second circuit means providing horizontal deflection signals for scanning the beams in said cathode ray tube, a yoke device mounted on said cathode ray tube and coupled to said first and second circuit means for producing a composite field for simultaneously scanning the beams, field producing means coupled to said second circuit means to be energized by substantially sawtooth deflection signals therefrom, said field producing means being mounted on said cathode ray tube in proximity to the path of one beam for modifying the horizontal deflection of said one beam independently of the horizontal deflection of the other beams, and variable means for regulating the sawtooth deflection signals applied to said field producing means.

7. In a color television receiver, a tri-beam cathode ray tube having a screen with horizontal and vertical dimensions, said cathode ray tube being of the type in which the beams travel spaced paths and impinge said screen, first circuit means providing sawtooth deflection signals for scanning the beams vertically across said screen, second circuit means providing sawtooth deflection signals for scanning the beams horizontally across said screen, a yoke device mounted on said cathode ray tube and coupled to said first and second circuit means for producing a composite field for simultaneously scanning the beams, said paths of said beams being spaced in the horizontal direction of said screen with one beam path intermediate the other two, and variable field producing means series coupled with said second circuit means and said yoke device to be energized by sawtooth signals from said second circuit means, said field producing means being mounted on said cathode ray tube in proximity to the path of said one beam for modifying the horizontal deflection of said one beam independently of the horizontal deflection of the other beams.

8. In a color television receiver including a tri-beam cathode ray tube and a line and field sweep system providing sawtooth deflection signals, the beam control system including in combination, a deflection yoke device adapted to be mounted on the cathode ray tube and to be coupled to the sweep system, said yoke device including a pair of line deflection windings and variable impedance means for apportioning signals therebetween, a beam convergence system adapted to be coupled to the sweep system and having field producing means adapted to be mounted adjacent the predeflection paths of the beams for converging the beams, a beam positioning magnet adapted to be mounted adjacent the path of one beam for modifying the preconvergence path of said one beam in the direction of line deflection, and variable inductor means associated with said beam positioning magnet and connected in series with said line deflection windings and said variable impedance means to be energized by sawtooth signals of line deflection frequency from the sweep system.

References Cited in the file of this patent

UNITED STATES PATENTS

| | | |
|---|---|---|
| 2,627,052 | Helpert et al. | Jan. 27, 1953 |
| 2,707,248 | Goodrich | Apr. 26, 1955 |
| 2,743,381 | Dietch | Apr. 24, 1956 |
| 2,752,520 | Morrell | June 26, 1956 |
| 2,769,110 | Obert | Oct. 30, 1956 |
| 2,780,749 | Dietch | Feb. 5, 1957 |
| 2,806,164 | Clay et al. | Sept. 10, 1957 |